March 19, 1963 G. MECKLER 3,081,943
SYSTEM FOR PRODUCING CONDITIONED AIR
Filed Dec. 8, 1959

INVENTOR.
GERSHON MECKLER
BY Owen & Owen

United States Patent Office 3,081,943
Patented Mar. 19, 1963

3,081,943
SYSTEM FOR PRODUCING CONDITIONED AIR
Gershon Meckler, Toledo, Ohio, assignor of two and one-half percent to Chester Devenow, and two and one-half percent to Irwin Fruchtman, both of Toledo, Ohio
Filed Dec. 8, 1959, Ser. No. 858,169
7 Claims. (Cl. 236—13)

This invention relates to a system for supplying air under predetermined conditions of temperature and humidity to a space and more particularly to a simplified system for supplying conditioned air by mixing two streams of air having predetermined relative humidities and different temperatures.

The new conditioning system according to the invention enables air under predetermined different conditions of dry bulb temperature and relative humidity to be supplied to several spaces having different requirements. The system accomplishes this in a simple manner by utilizing two streams of air at different predetermined dry bulb temperatures and water vapor contents, which streams are combined in controlled proportions with the aid of mixing valves responsive to the temperature of the mixture. The water vapor content of the mixture of the two streams varies as a straight line function of the temperature of the mixture. As a consequence, the quantity of water vapor per unit of dry air can be controlled by controlling this mixture temperature. The amount of water vapor necessary to attain a particular relative humidity in a space can be determined from a psychrometric chart and the mixing valves then adjusted to obtain an air mixture which will contain this amount of water, as controlled by the mixture temperature. The mixture is then heated by suitable means controlled by the temperature in the space before being supplied thereto in order to establish the desired dry bulb temperature. Thus, by the use of two temperature-responsive devices, one in the space and one in the air mixture, the dry bulb temperature and the relative humidity of the air in the space can be determined and maintained.

The new system employs simple and accurate controls which are relatively inexpensive and which eliminate the necessity of employing elaborate networks of unstable booster humidifiers.

It is, therefore, a principal object of the invention to provide a system for supplying air under given conditions to several spaces, which system is simple, accurate, and inexpensive.

Another object of the invention is to provide a system for controlling the relative humidity of air in a space by combining two streams of air having the same relative humidity but different moisture contents.

Figure 1:
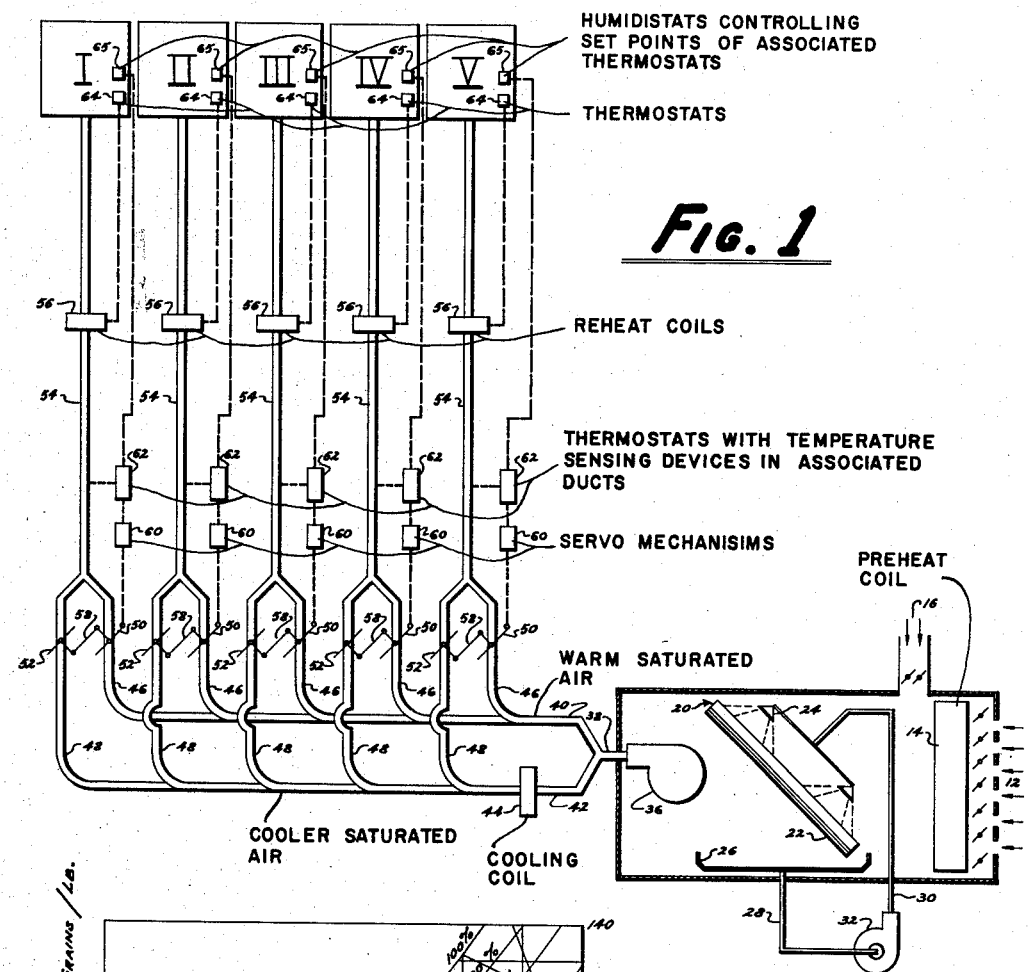
Figure 2:
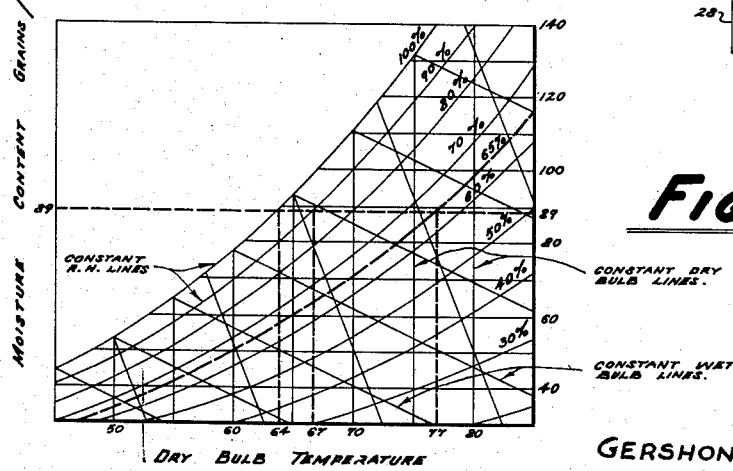

Other objects and advantages of the invention will be apparent from the following detailed description of a preferred embodiment thereof, reference being made to the accompanying drawing, in which:

FIG. 1 is a line diagram of a system for conditioning air in accordance with the principles of the invention; and FIG. 2 is a simplified psychrometric chart to which reference will be made in the explanation of the invention.

Referring to the drawing and more particularly to FIG. 1, the illustrated system in accordance with the principles of the invention is capable of supplying air at different dry bulb temperatures and relative humidities to a large number of spaces, five being shown. By way of example, the system can be employed in a hospital in which a space I represents a nursery requiring air having a dry bulb temperature of 77° F. and a relative humidity of 65 percent, space II represents an operating room with the air having a dry bulb temperature of 80° F. and a relative humidity of 55 percent, space III represents patient rooms with the air having a dry bulb temperature of 80° F. and a relative humidity of 50 percent, space IV represents a recovery room with the air having a dry bulb temperature of 75° F. and a relative humidity of 55 percent, and space V represents an allergy room with the air having a dry bulb temperature of 76° F. and a relative humidity of 45 percent.

Outside air or air from any suitable source is drawn through a fresh air intake 12 and heated to a desired temperature by a suitable preheat coil 14. Return air can also be supplied through a duct 16 for mixing with the heated outside air downstream of the coil 14. The heated air is then passed through an adiabatic washer 20 comprising a porous screen or wall 22 over which water is directed from sprays 24. This water is collected in a sump 26 and is recirculated through pipes 28 and 30 by a pump 32 to the sprays 24. The washer 20 has two principal functions. It washes bacteria or other airborne contaminants from the air, which contaminants can be eliminated by control of makeup water, by means of submerged ultra-violet lamps in the sumps 26, or by controlled addition of a non-volatile bactericide or bacteriostat. Secondly, the washer adiabatically saturates the air which makes its dry bulb temperature substantially equal to its wet bulb temperature.

The air is then drawn through a blower 36 from which it is delivered through a discharge duct 38 to a warm air main duct 40 and a cool air main duct 42. The air in the duct 38 is at a slightly higher temperature than after adiabatic saturation because of the work done on it by the blower, and, hence, is slightly below saturation, or has a relative humidity slightly less than 100 percent. That portion of the air passing through the cool air main duct 42 is then cooled by a cooling coil 44 to a temperature lower than that of the air in the warm air main duct 40 whereby water is condensed from the cooled air. It may be noted that each of the main ducts 40 and 42 contains air which is substantially saturated, having the same relative humidity, but having substantially different dry bulb temperatures, wet bulb temperatures, and moisture contents.

A branch duct 46 leading from the warm air duct 40 is provided for each of the spaces I—V and a branch duct 48 leading from the cool air main duct 42 is similarly provided for each space. The branch ducts 46 and 48 contain mixing valves 50 and 52 for controlling the relative proportions of the warm and cool air which mix in supply ducts 54. These ducts contain reheat coils 56 which raise the temperatures of the air mixtures to the desired dry bulb temperatures to be maintained in the spaces I—V. The relative humidities of the air in these spaces are determined by the moisture contents of the air in the ducts 54 which, in turn, are controlled by the proportional amounts of air supplied from the branch ducts 46 and 48, as determined by the mixing valves 50 and 52. The mixing valves are connected by suitable linkages 58 which cause one valve to move toward a closed position as the other valve moves toward an open position. In this instance the valves 50 are driven by servo mechanisms 60 regulated by temperature-responsive instruments such as thermostats 62 which are responsive to temperatures of the air in the ducts 54. When the temperature in one of the ducts 54 is above that desired, the thermostat 62 in that duct actuates its associated servo mechanism 60 to cause the appropriate valve 50 to move toward a closed position and, through the linkage 58, to cause the valve 52 to move toward an opened position. This increases the proportion of cool air in the mixture and lowers the mixture temperature in the duct 54. The moisture content of the mixture is also decreased because of the larger proportional amount of the cool air in the mixture, which air has a lower moisture content than the warm air. When the temperature in the duct 54 is below that desired, the servo mechanism 60 causes the valves 50 and 52 to act oppositely and increase the relative amount of warm air. A thermostat 64 in each of the spaces I—V similarly controls each of the reheat coils 56, supplying more heat thereto when the dry bulb temperature in the space is below that desired and reducing the heat thereto when the temperature is above that desired. A humidistat 65 is also provided in each of the spaces, and each is operatively associated to reset the control point of the corresponding thermostat 62 to establish a new air mixture temperature control point in one of the ducts 54 in response to a desired change in humidity level in any one of the spaces I—V.

The proper amount of moisture necessary to maintain the desired relative humidity in the spaces I—V can be determined from a psychrometric chart. Thus, in the nursery designated space I, the air having a dry bulb temperature of 77° F. and a relative humidity of 65 percent will require moisture in an amount of 89 grains of water vapor per pound of dry air (see FIG. 2) in the supply duct 54 which serves the nursery. From the psychrometric chart, for the air at 100 percent relative humidity in the duct 54 to have a moisture content of 89 grains of water vapor per pound of dry air, it must have a dry bulb temperature of 64° F., which is also the wet bulb temperature. Therefore, by maintaining the temperature in the duct 54 at 64° F. and the room temperature at 77° F., the desired relative humidity of 65 percent is maintained. This is easily accomplished with only the two temperature controls and the mixing dampers. It is not necessary to know the actual proportional amounts of two air streams which are employed nor is it necessary to know the temperature, either wet bulb or dry bulb, of either of the two streams, as long as they have the same relative humidity.

Because the lines representing constant relative humidity are slightly curved upwardly rather than straight (see FIG. 2), and because the conditions representing the resulting mixture of the two streams of air will lie on a straight line between two points representing the conditions for the two streams, the point representing the mixture will lie above the 100 percent relative humidity line. As a consequence, a mixture of two saturated streams would have a slight excess of moisture, above saturation. This would undesirably result in condensation of moisture in the duct 54, maintaining the duct wet and promoting bacteria growth. However, this is overcome by the heating of the air by the blower 36 which produces a relative humidity of the air in the warm air main duct 40 slightly under 100 percent so that no excess moisture will result upon mixing of the slightly less than saturated warm air in the duct 40 with the fully saturated, cooled air in the duct 42.

It may be noted that the moisture content of the air in the cool air main duct 42 must be no greater than the minimum amount required in any of the spaces I—V, in this case about 60 grains per pound of dry air in the space V. To obtain this, reference to a standard psychrometric chart indicates that the air in the duct 42 must be cooled to 53° F. or below at 100 percent relative humidity (not illustrated in FIG. 2). Similarly, the maximum water vapor in the air in the duct 40 must be at least as much as the maximum required in any of the spaces I—V. In this case, the maximum amount of water vapor will be in the nursery and will be about 89 grains per pound of dry air. To obtain this amount, the air in the duct 40 must be at least about 64° F. at 100 percent relative humidity (not illustrated in FIG. 2).

To control relative humidity in the manner previously described by means of the temperature devices 62 in the ducts 54, it is only necessary that the relative humidities of the air in the ducts 40 and 42 be the same and be known. While maintaining these relative humidities at 100 percent is the easiest and preferred method of keeping them equal, they might be maintained at 90 percent, for example, by washing the air in the duct 40 with a dilute solution of lithium chloride at a proper strength and temperature to maintain the air in equilibrium at 90 percent relative humidity, and by washing the air in the duct 42 downstream of the cooling coil 44 with a dilute solution of lithium chloride to produce a relative humidity of 90 percent of the air in this duct, too. With air at 90 percent relative humidity the temperature of the air mixture necessary for a particular moisture content can be determined as easily as with saturated air. Thus, for the nursery, a moisture content of 89 grains per pound of dry air is still necessary. For air at 90 percent relative humidity, a dry bulb temperature of 67° F. (see FIG. 2) will enable the air to carry this amount of moisture.

Depending on the temperature of the outside air or air from some other source employed in the system, a cooling coil might be used in place of the preheat coil 14, and, in some instances, the source of air might contain sufficient water vapor that no washer is necessary at all, particularly if other means are employed to remove air-borne contaminants therefrom, or if no removal is deemed necessary.

It will be appreciated that an important feature of the invention, as previously described, resides in the elimination of the necessity for cycling of the cooling coil 44. Such coil operates constantly, and is utilized at all times both to cool air and to condense moisture therefrom. It has been found that air-borne bacteria tend to collect in condensate on such a coil, but that the bacteria constitute no significant health hazard unless the operation of the coil is cyclic, and then only during the portion of the cycle when the condensate is being re-evaporated. During such portion of the cycle collected bacteria from the condensate are introduced into the air stream, with the result that dangerously high bacteria counts are frequently encountered. So long as the coil 44 in the system according to the invention is operated to maintain saturated air in the duct 42 on the downstream side of the coil, the temperature of the saturated air can vary between the maximum, as discussed above, and freezing without affecting control conditions, so that the system eliminates the need for cycling to effect control.

Whenever the system according to the invention is operated to maintain both a constant temperature and relative humidity in the air supplied to the ducts 46 and 48, and whether or not the relative humidities are equal, either the previously discussed temperature control or volume proportioning controls can be employed to provide the required moisture vapor content in the ducts 54. However, the major advantages of the system according to the invention are realized only when the air supplied to the duct 46 is at the same relative humidity as the air supplied to the duct 48, and most desirably the relative humidity is substantially 100 percent in both ducts.

By control of humidity levels in substantially adjacent spaces I—V it is possible to control by vapor pressure difference staging the path of moisture migration and its associated contamination in air, thereby eliminating it as a significant factor in cross contamination between these areas.

Other modifications of the invention will be apparent to those skilled in the art after reading the above description and viewing the accompanying drawing. It is to be understood that such modifications can be employed without departing from the spirit and scope of the invention as defined in the appended claims.

What I claim is:

1. Apparatus for supplying air at a plurality of dry bulb temperatures ranging from T to T + delta T and containing from X to X + delta X grains of water per pound, said apparatus comprising means forming a plurality of supply passages, means for providing a stream of air substantially saturated with water vapor and containing at least X + delta X grains of water per pound, and for delivering portions of such stream to each of said supply passages, means for delivering to each of said supply passages portions of a second stream of substantially saturated air containing not more than X grains of water per pound, means responsive to the temperature of the mixture of such first and second streams in each of said supply passages and effective to control the relative proportions of such first and second streams to maintain the dry bulb temperature of such mixture in each at substantially the temperature of saturated air containing the number of grains of water per pound to be supplied, and means for heating such mixture in each of said supply passages to a predetermined dry bulb temperature.

2. Apparatus for supplying air at a plurality of dry bulb temperatures ranging from T to T + delta T and containing from X to X + delta X grains of water per pound, said apparatus comprising means forming a plurality of supply passages, means for providing a stream of air of substantially Y percent relative humidity and containing at least X + delta X grains of water per pound, and for delivering portions of such stream to each of said supply passages, means for delivering to each of said supply passages portion of a second stream of air of substantially Y percent relative humidity containing not more than X grains of water per pound, means responsive to the temperature of the mixture of such first and second portions in each of said supply passages and effective to control the relative proportions of such first and second streams to maintain the dry bulb temperature of such mixture in each at substantially the temperature of air of Y percent relative humidity containing the number of grains of water per pound to be supplied, and means for heating such mixture in each of said supply passages to a predetermined dry bulb temperature.

3. Apparatus for supplying air at a dry bulb temperature of T and containing X grains of water per pound, said apparatus comprising means forming a supply passage, means for providing a stream of air substantially saturated with water vapor and containing more than X grains of water per pound, and for delivering such stream to said supply passage, means for delivering to said supply passage a second stream of substantially saturated air containing less than X grains of water per pound, means responsive to the temperature of the mixture of such first and second streams in said supply passage and effective to control the relative proportions of such first and second streams to maintain the dry bulb temperature of such mixture at substantially T', where T' is the temperature of saturated air containing X grains of water per pound, and means for heating such mixture in said supply passage to a dry bulb temperature of T.

4. Apparatus for supplying air at a dry bulb temperature of T and containing X grains of water per pound, said apparatus comprising means forming a supply passage, means for providing a stream of air of substantially Y percent relative humidity and containing more than X grains of water per pound, and for delivering such stream to said supply passage, means for delivering to said supply passage a second stream of air of substantially Y percent relative humidity containing less than X grains of water per pound, means responsive to the temperature of the mixture of such first and second streams in said supply passage and effective to control the relative proportions of such first and second streams to maintain the dry bulb temperature of such mixture at substantially the temperature of air of Y percent relative humidity containing X grains of water per pound, and means for heating such mixture in said supply passage to a dry bulb temperature of T.

5. Apparatus for supplying air at a dry bulb temperature of T and containing X grains of water per pound, said apparatus comprising means forming a supply passage, means for providing a stream of air substantially saturated with water vapor and containing more than X grains of water per pound, and for delivering a first portion of such stream to said supply passage, means for diverting a second portion of such stream of substantially saturated air and for delivering such second portion to said supply passage, means effective to lower the dry bulb temperature of the second portion of such stream and to condense water therefrom to condition such portion to a substantially saturated condition containing not more than X grains of water per pound, means responsive to the temperature of the mixture of such first and second portions in said supply passage and effective to control the relative proportions of such first and second streams admitted to said supply passage to maintain the dry bulb temperature of such mixture at substantially T', where T' is the temperature of saturated air containing X grains of water per pound, and means for heating such mixture in said supply passage to a dry bulb temperature of T.

6. Apparatus for supplying air containing from X to X+delta X grains of water per pound to each of a plurality of zones, said apparatus comprising means forming a supply passage to each of the zones, means for providing a stream of air of substantially Y percent relative humidity and containing more than X+delta X grains of water per pound, and for delivering such stream to each of said supply passages, means for delivering to each of said supply passages a second stream of air of substantially Y percent relative humidity containing less than X grains of water per pound, and means effective to control the relative proportions of such first and second streams delivered to each of said supply passages to maintain the dry bulb temperature of each such mixture at substantially the temperature of air of Y percent relative humidity containing a predetermined number from X to X+delta X of grains of water per pound.

7. Apparatus for supplying air containing from X to X+delta X grains of water per pound to each of a plurality of zones, said apparatus comprising means forming a supply passage to each of the zones, means for providing a stream of air substantially saturated with water vapor and containing more than X+delta X grains of water per pound, and for delivering such stream to each of said supply passages, means for delivering to each of said supply passages a second stream of substantially saturated air containing less than X grains of water per pound, and means effective to control the relative proportions of such first and second streams delivered to each of said supply passages to maintain the dry bulb temperature of each such mixture at substantially the temperature of saturated air containing a predetermined number from X to X+delta X of grains of water per pound.

References Cited in the file of this patent

UNITED STATES PATENTS

| 1,949,735 | Bulkeley | Mar. 6, 1934 |
| 2,044,352 | Evans | June 16, 1936 |
| 2,747,842 | Shataloff | May 29, 1956 |
| 2,953,215 | Vaisala | Sept. 20, 1960 |

FOREIGN PATENTS

| 331,538 | Great Britain | July 3, 1930 |

OTHER REFERENCES

Control Manual for Heating, Ventilating and Air Conditioning, copyright 1940 by Minneapolis-Honeywell Regulator Co., Minneapolis, Minn. Pages 100 and 104. (Copy in Div. 19.)